(12) United States Patent
Bell et al.

(10) Patent No.: US 7,840,588 B2
(45) Date of Patent: Nov. 23, 2010

(54) REAL-TIME ATTRIBUTE PROCESSOR AND SYNTAX SCHEMA FOR DIRECTORY ACCESS PROTOCOL SERVICES

(75) Inventors: Jason M. Bell, Austin, TX (US); Mark Joseph Cavage, Austin, TX (US); Kristin Marie Hazlewood, Austin, TX (US); Gary Dale Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 10/809,583

(22) Filed: Mar. 25, 2004

(65) Prior Publication Data

US 2005/0216485 A1    Sep. 29, 2005

(51) Int. Cl.
*G06F 17/30* (2006.01)
(52) U.S. Cl. .................................... 707/769
(58) Field of Classification Search .............. 707/1, 707/999.1, 769
See application file for complete search history.

(56) References Cited

U.S. PATENT DOCUMENTS

| | | | |
|---|---|---|---|
| 5,778,377 A | 7/1998 | Marlin et al. | 707/103 |
| 6,247,017 B1 | 6/2001 | Martin | 707/102 |
| 6,263,367 B1 | 7/2001 | Chu et al. | 709/223 |
| 6,418,446 B1 | 7/2002 | Lection et al. | 707/103 |
| 6,539,425 B1 * | 3/2003 | Stevens et al. | 709/220 |
| 2002/0032775 A1 | 3/2002 | Venkataramaiah et al. | 709/225 |
| 2002/0032783 A1 | 3/2002 | Tuatini | 709/229 |
| 2002/0061741 A1 * | 5/2002 | Leung et al. | 455/414 |
| 2002/0147857 A1 * | 10/2002 | Sanchez et al. | 709/316 |
| 2003/0120502 A1 * | 6/2003 | Robb et al. | 705/1 |
| 2003/0158951 A1 | 8/2003 | Primak et al. | 709/229 |
| 2003/0163517 A1 | 8/2003 | Assaf et al. | 709/203 |
| 2004/0031058 A1 * | 2/2004 | Reisman | 725/112 |
| 2004/0064502 A1 * | 4/2004 | Yellepeddy et al. | 709/203 |
| 2005/0021498 A1 * | 1/2005 | Boreham et al. | 707/1 |
| 2008/0086402 A1 * | 4/2008 | Patel et al. | 705/35 |

OTHER PUBLICATIONS

"LDAP: A Next Generation Directory Protocol", by Gordon Benett, downloaded from http://www.intranetjournal.com on Feb. 17, 2004, 4 pages.
"iSeries LDAP Directory Server (LDAP)", downloaded from http://www-1.ibm.com/servers/server/eserver/iseries/ldap/ on Feb. 17, 2004, 3 pages.

(Continued)

*Primary Examiner*—John R. Cottingham
*Assistant Examiner*—Kimberly Lovel
(74) *Attorney, Agent, or Firm*—Robert H. Frantz; Jeffrey S. LaBaw

(57) ABSTRACT

A directory server handles requests for values of dynamic attributes by providing at least one declaration for an attribute to be handled as a real-time attribute associated with but external to a directory structure; receiving a directory access protocol request for access to an attribute value from the associated directory structure; detecting requested access to an attribute declared as a real-time external attribute; resolving a real-time value by obtaining an attribute value from a real-time source external to the directory structure; converting the obtained attribute value from a real-time attribute to a static attribute, wherein the real-time attribute is incompatible with the directory access protocol, and wherein the static attribute is compatible with the directory access protocol; and returning to a requester the converted real-time attribute directly in the directory access protocol, wherein storing and updating of the converted real-time attribute value in the directory structure is eliminated or avoided.

18 Claims, 10 Drawing Sheets

OTHER PUBLICATIONS

Thayer, Rodney, "What is Network Policy Enforcement?", retrieved on Jan. 26, 2009 from http://www.opus1.com/nac/whitepapers-old/06-policy-enforcement-Iv05.pdf.

WHATIS.COM, "Policy Server", retrieved on Jan. 26, 2009 from http://searchsecurity.techtarget.com/sDefinition/ ,,sid14_gci1150037,00.html.

* cited by examiner

REAL-TIME ATTRIBUTE PROCESSOR AND SYNTAX SCHEMA FOR DIRECTORY ACCESS PROTOCOL SERVICES

BACKGROUND OF THE INVENTION

1. Field of the Invention

This invention relates to the arts of processors for requests to directory servers, and especially to processors for directory access protocol servers such as LDAP servers.

2. Description of the Related Art

In the 1970s, many proprietary communications, computing, and data storage systems developed were incompatible with each other. In order for integration of communications and computing technologies to be implemented successfully, standards were needed to allow equipment and systems from different vendors to interoperate. Committees such as the International Standards Organization ("ISO") and Consultative Committee on International Telephony and Telegraphy ("CCITT") led the effort which resulted in the Open Systems Interconnect ("OSI"), which defined a seven-layer model of data communication with physical transport at the lower layer and application protocol at the upper layer.

The Defense Advanced Research Project Agency ("DARPA") sponsored research projects that led the Internet standard effort. The Internet Architecture Board ("IAB") and its subsidiary, the Internet Engineering Task Force ("IETF"), created guidelines for the Internet using documents called Request for Comments ("RFC").

After an IETF RFC has been approved, has been implemented and has been used for a period of time, it becomes a standard. The OSI approaches standardization using a formal process, while IETF uses an informal process.

In today's businesses environment, more companies are increasingly relying on networked computer systems to support distributed software. These distributed applications often interact with computers on the same local area network ("LAN"), within a corporate intranet, or anywhere on the worldwide Internet. Because these applications contain vast amount of data such as services, resources, users and other objects accessible from other modules, information needs to be organized in a clear and consistent manner. Much of this data can be shared among many applications, but it must also be protected to prevent unauthorized modification or disclosure of private information. Typically, to improve functionality, ease of use and to enable cost-effective administration, information is collected into a special database, sometimes called a directory.

As the number of applications and different networks has grown, the number of specialized directories has also increased, resulting in separate "islands" of data that cannot be readily shared, and which are difficult to maintain.

"Directory Services" refers to a collection of communications, data storage, and user management functions which allow owners and operators of internetworked computers to manage access to their computer resources, to keep track of the users of a network. Usually, these tasks are performed from one or more administration consoles.

Using Directory Services, an administrator can typically set up and control a set or group of users, and may manage those users (e.g their privileges, authorizations, identification profiles, etc.) using a directory with a graphical user interface (GUI). Users of computers at remote locations can be added, modified, and managed by a remotely located administrator. In some directory service products, application programs can be distributed electronically and maintained remotely by administrators, as well.

Practically every major supplier of computing platforms, be it operating systems, storage solutions, or entire enterprise computing environments, has a directory service product. However, many of the early directory service products and protocols were also proprietary and incompatible from one vendor to another.

In 1988, the CCITT created the X.500 standard for directory services. X.500 organizes directory entries in a hierarchical name space capable of supporting large amounts of information. To ease the information retrieval process, it also defines the powerful search capabilities. Therefore, X.500 is often used together with add-on modules for interoperation between incompatiable directory services because of its functionality and scalability.

X.500 specifies that communication between a directory client and a directory server shall be accomplished using a Directory Access Protocol ("DAP"). However, as an application layer protocol, the X.500 DAP requires the entire OSI protocol stack to operate. This requires more resources than are available in many computing environments. Therefore, an interface to an X.500 directory server that is less resource-intensive was needed.

Lightweight Directory Access Protocol ("LDAP") is intended to be the solution to solve DAP's resource-intensive disadvantages, and to simplify data access in a complex computing environment. LDAP is an open industry guideline aimed at standardizing the access interface to directories. Its objective is to promote sharing and simplifying management of information regarding individual and entire resource of a company, as well as, access rights of individual resources. LDAP aids the interoperability of applications and information systems by sharing profiles, and improves access security to those applications.

The two main concepts of LDAP is the structure of the directories themselves, and its protocol which is used to access the information stored in those directories. From LDAP's point of view, a directory is essentially a listing of information about objects arranged in some order that gives details about each object. A library card catalog and a city's telephone book are common examples which are often implemented in LDAP format.

A directory is often described as a database, however, it is a specialized database that has characteristics that set it apart from general purpose relational database. An LDAP directory provides search, navigation, localization and authentication management.

An LDAP directory has the following characteristics:

(a) stored data is expected to be accessed by "read" or "search" operations much more often than by "write" updates;
(b) stored data represents relatively "static" information (e.g. telephone numbers, addresses, etc.) which seldom is changed or updated, and as such, its access protocol is optimized for this purpose;
(c) it may not support complex transactions due to its design;
(d) it uses remote access and requires low network bandwidth to access static information;
(e) it classifies information hierarchically;
(f) it utilizes databases as its storage engine;
(g) it may impose limitations in the type of data stored; and
(h) it uses a simplified and optimized access protocol to access information in slim and relatively simple applications.

Currently, most directory service protocols such as LDAP store static data values for each attribute in entries. Some directory service product suppliers have been able to slightly work around this limitation for very specific cases (e.g. Dynamic groups), but not for regular (e.g. normal) entries. Having this static data limitation proves to be a limiting factor for directories in high volume update scenarios, such as telecommunications. For example, some users of the IBM Directory Server use it to store mobile telephone profile information and locations. This is a heavy burden on the system since the client must constantly poll the server to push its updated information.

A simpler example of the problem can be described in a practical manner as follows. Suppose that a user wishes to create an LDAP directory containing information about each city in their county. Certain data will be relatively static (e.g. Population, GPS coordinates, etc.), but other data is guaranteed to be volatile (e.g. Current temperature). In order to facilitate updating weather information, a client program needs to constantly poll an information source and update the records in the directory far too frequently.

In order to better understand LDAP's umbrella framework and limitations with regard to static and dynamic data, we turn now to FIG. 1. In this illustration of a typical hierarchical data classification model (10), a root level (11) is the topmost entity in the hierarchy. The root level is further organized into geographic regions (12), such as North America, Asia, Europe or even specific countries like United States, Mexico and Canada.

These geographic regions are then further organized into constituent organizations, companies, and/or states (13). These entities are then often broken down into "organizational units" ("OU") (14), such as departments or divisions, which then include individual unites (15) such as users, and resources (e.g. printers, servers, gateways, etc.)

As such, LDAP's structure is very similar to a typical organizational chart. In addition, each attribute within the framework contains an object identifier ("OID") that has unique assignment. Each entry in the directory is an instance of a objectclass and comprises an attribute-value pair, and each objectclass contains one or more attributes. There may be multiple values in a directory of the same attribute. The OID associated with each objectclass and with each type of attribute is typically expressed as several numbers separated by a "dot" or period punctuation mark. Each number represents a branch in the hierarchical tree. OID's are typically assigned and maintained by a central registrar in order to assure the uniqueness of each OID's values, and to avoid confusion between information elements which are different but may otherwise assume a similar or equal identifier value.

FIG. 2 depicts an overview (20) of LDAP communications. A remote user or application program (22, 23), such as a bank teller using an LDAP-enabled web browser program (e.g. an LDAP client) may initiate a search for the account number and mailing address for customer A. In this example, customer name, account number and address are three attributes, and the bank teller is requesting the values of attributes:

customername.account_number and customername.mailing_address where custermername="customer A".

The search request is transmitted from the LDAP client to the LDAP directory (24) via a communications network (21), such as the Internet, typically using Transmission Control Protocol/Internet Protocol (TCP/IP) (27, 28, 29).

Once the request reaches the LDAP Server (26), the server will process the request by searching for the information within its directory (25). Customer A's account number and address are retrieved (e.g. "read"), and returned to the requesting user or application program (27, 28) via the communications network (21). The LDAP client receives the search results, and displays the information to the bank teller.

Similarly, the teller can search for other specific data about customer A, such as driver license number or a list of checks cleared within a time frame. With appropriate user authorization, the bank teller may modify the customer's account information within the directory. The modification process, however, takes multiple exchanges within the LDAP protocol to access the directory, which increases network traffic.

FIG. 3 shows a generalized request or "read" sequence (30) under LDAP. In this sequence, time progresses from top to bottom of the figure, and two applications (22, 23) are shown accessing an LDAP server and directory (24). In this diagram, it is important to note that the arrows represent multiple commands, requests, and responses according to the LDAP protocol.

The first application (22), perhaps a web application, is configured to periodically change or update a value for an static attribute stored in the directory (24), while a second application (23) is configured to periodic read or monitor the value of the same static attribute. This value could be, for instance, recent stock prices which are updated in 20 minute intervals.

According to this example, the first web application (22) regularly updates stock prices to the LDAP directory server (24) by first gaining access to the directory through a series of steps (31) to authenticate itself and become authorized to modify values of attributes stored in the LDAP directory (24). After authentication and authorization steps are complete, the first application (22) performs a series of LDAP commands (32) to modify the values (e.g. the stock values) of the stock value attribute for a number of companies (24), such as:

ibm.stock_value att.stock_value amzn.stock_value for IBM, AT&T and Amazon.com, respectively.

Further according to this example, a second application's (23) purpose is to display the latest stock price to bank employees on a web browser screen. To do so, the second application (23) sends an inquiry to the LDAP directory server (24) and follows a similar authorization/authentication process (33). Once permission is granted by the LDAP server (24), the second application (23) performs a "read" request (34) and receives the values (e.g. stock prices) of the request attributes from the LDAP directory (24), which it then displays on the web browser screen.

Asynchronous to the operations of each other, the first application (22) periodically performs the authentication, authorization, and update processes (36, 35) again to change the values (e.g. stock prices) of the static attributes stored in the directory, and the second application (23) periodically performs the authentication, authorization, and attribute read processes (37, 38) to update the display of the stock price. At any given time, the information displayed by the second application may be aged by 1 to 2 times the length of the update periods of either application (e.g. 20-40 minutes in this example).

As each of these processes actually involves several steps or communication exchanges, limited communications bandwidth can become a problem when either the period of the value updates decreases significantly (e.g. it is updated often), when many simultaneous read requests are being handled (e.g. a lot of clients reading the value), or both. This is not usually a problem for attributes which represent relatively static information (e.g. unchanging or seldom changing data), but a significant problem arises when highly dynamic information is represented within the LDAP directory.

Turning to FIG. 4, the diagram illustrates how the current LDAP process handles more dynamic information (40), such as a stock ticker (e.g. real-time stock values), news headlines, etc. When value (41, 42) of an attribute changes at times $t_1$ and $t_3$, a first application (22) receives or polls a source for the dynamic data, and then must perform the LDAP authentication, authorization, and attribute modification processes to the LDAP directory (24) to update the corresponding attribute values. If the elapsed time between $t_1$ and $t_3$ is relatively short, or if many entries must be updated (or both conditions exist), then the number of steps in the LDAP protocol required to perform the attribute updates and the bandwidth of the communications links between the LDAP server (24) and the server on which the first application (22) is running can become a seriously limiting factor for real-time performance (e.g. updates may not occur in a timely fashion).

Similarly, if the times between consecutive "reads" $t_2$ and $t_4$ of an attribute value are relatively short, even if from different applications or clients, then the number of steps in the LDAP protocol required to perform the attribute reads and the bandwidth of the communications links between the LDAP server (24) and the server on which the requesting applications are running can become a considerably limiting factor for real-time performance (e.g. reads may not occur in a timely fashion).

These performance issues are compounded in situations where an LDAP directory is used to store many attributes which represent data which is changed often or rapidly, when many "reader" applications are configured to access that information, and where communications bandwidth at the LDAP server is limited, often leads to unsatisfactory system performance.

For these reasons, there exists a need in the art for a system and method which addresses real-time handling of dynamic data within LDAP directory services and directory services like it. In addition, there exists a need to support such open directory protocols, such as LDAP, to make it extensible regardless of frequent data value changes.

DESCRIPTION OF THE DRAWINGS

The following detailed description when taken in conjunction with the figures presented herein present a complete description of the present invention.

SUMMARY OF THE INVENTION

Figure 1:
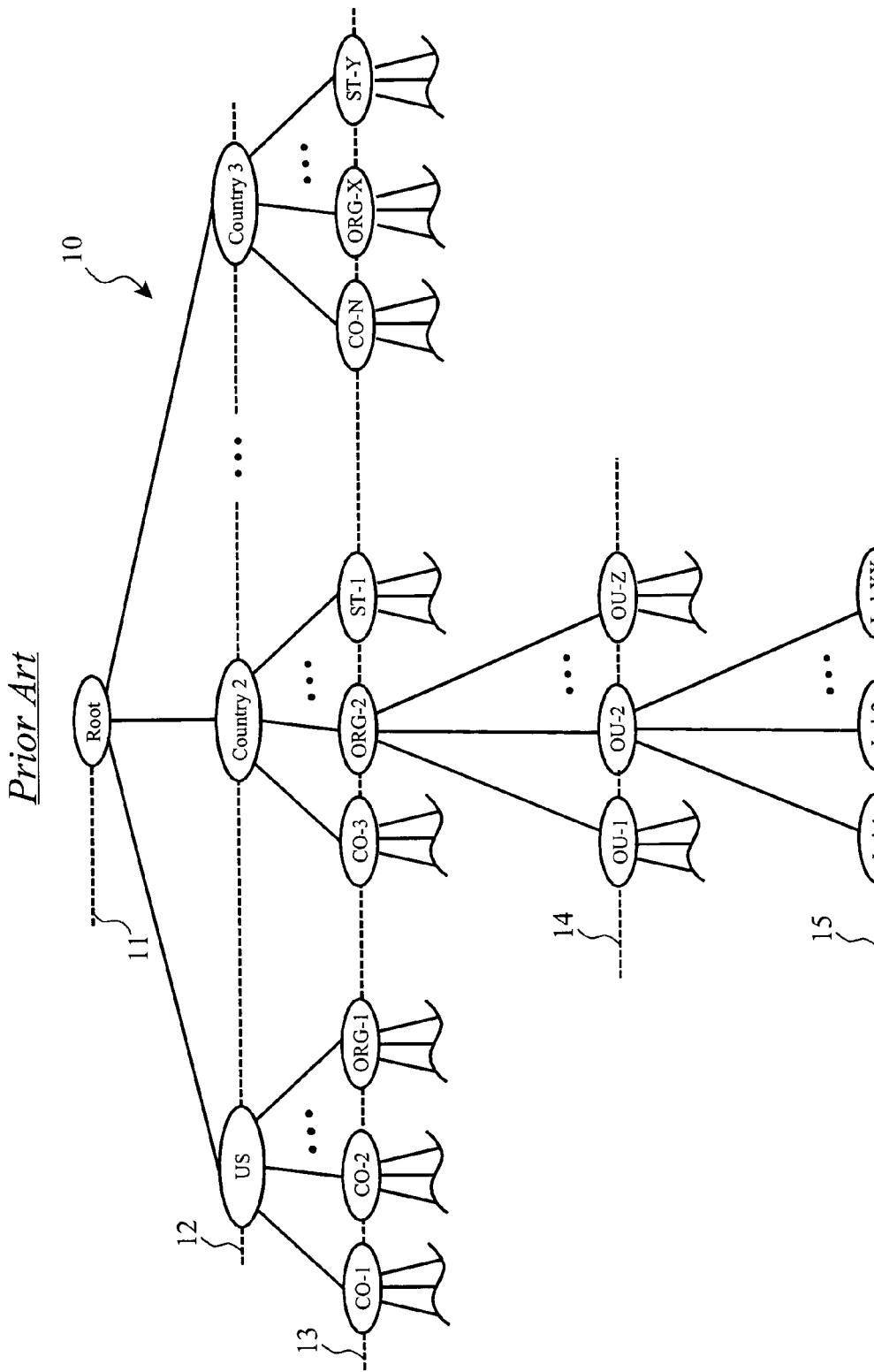
FIG. 1 illustrates the hierarchical organization of LDAP.
Figure 2:
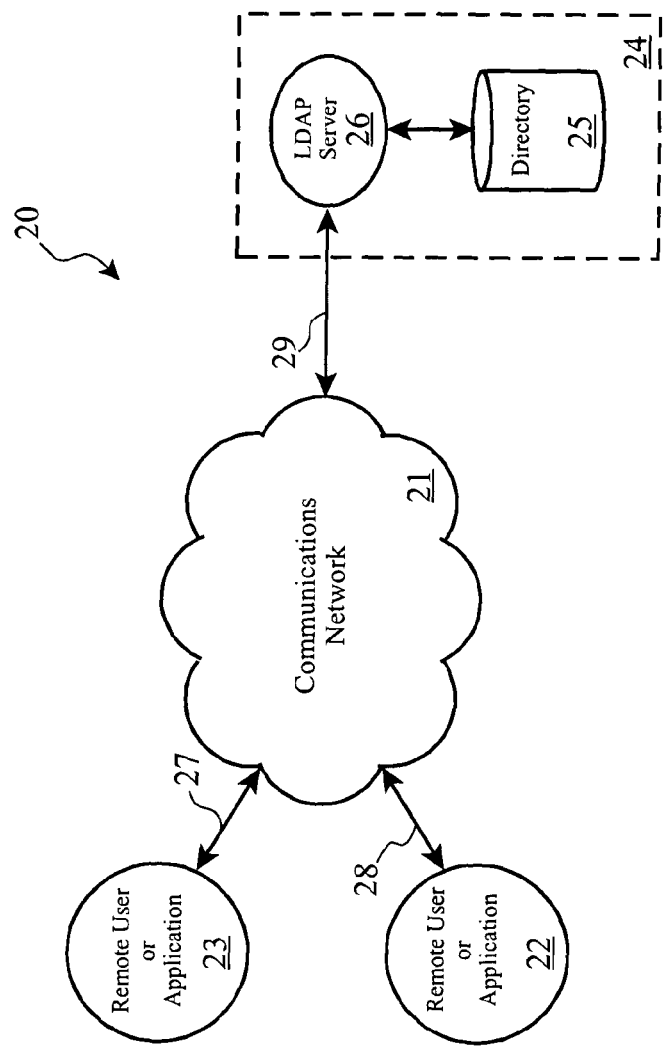
FIG. 2 depicts LDAP communications processes.

Our Real-time Attribute Processor ("RTAP") functionally cooperates with directory servers to handle requests for dynamic attributes by providing at least one declaration for an attribute to be handled as a real-time attribute associated with but external to a directory structure; receiving a directory access protocol request for access to an attribute value from the associated directory structure; detecting requested access to an attribute declared as a real-time external attribute; resolving a real-time value by obtaining an attribute value from a real-time source external to the directory structure; converting the obtained attribute value from a real-time attribute to a static attribute, wherein the real-time attribute is incompatible with the directory access protocol, and wherein the static attribute is compatible with the directory access protocol; and returning to a requester the converted real-time attribute directly in the directory access protocol, wherein storing and updating of the converted real-time attribute value in the directory structure is eliminated or avoided.

DETAILED DESCRIPTION OF THE INVENTION

The present invention, referred to as a "Real-time Attribute Processor" ("RTAP"), handles dynamic data for directory services which are optimized for relatively static data, such as Lightweight Directory Access Protocol ("LDAP"). There are a number of directory access protocols and products which either provide similar functionality as LDAP, or which incorporate or are compliant with LDAP, including but not limited to X.500 DAP (previously described), Netscape's Communicator suite of products, Microsoft's Active Directory and a number of their products including Outlook Express, Novell's NetWare Directory Services, and a number of networking products from Cisco Systems. In the following paragraphs, we will provide several example embodiments including circuits, computing platforms, programming methodologies, and directory services servers. The logic of the invention may be realized in electronic circuitry, such as in Application Specific Integrated Circuits or programmable logic. Alternatively, the logic of the invention may be realized in part or in its entirety as software-implemented processes and methods.

It will be recognized by those skilled in the art that the present invention may be adapted for use with alternate computing platforms, programming methodologies, directory servers, products incorporating or compliant with directory access protocols, and directory access protocols themselves, without departing from the spirit and scope of the invention.

Object Identifiers for Real-Time Resolved Attributes

We have developed an enhanced directory service framework whereby user-specified attributes are never stored statically in the director, but instead are resolved in real-time by launching user implementations (e.g. a user-supplied program, script, or library function). Such real-time attributes are denoted using our special schema syntax marking, as described in the following paragraphs.

Firstly, a special Object Identifier ("OID") is declared for the syntax of our real-time attributes. When a user wishes to add a real-time attribute to the directory server, they first add the attribute into the schema repository in a manner similar to adding a static LDAP attribute, but the dynamic attribute is declared with our special syntax, such as:

attributetypes=(1.3.18.0.2.4.007
NAME 'currentTemp'
DESC 'Provides a means of retrieving the current temperature.'
EQUALITY 2.5.13.2
SYNTAX 1.2.3.4
USAGE dynamicUserApplications This example declaration for a dynamic attribute follows conventional BNF form, and declares a unique and previously-registered OID for the example attribute "currentTemp" to be a value which is not statically stored in the directory, but which is to be resolved in real-time by a user-supplied process, module, method, or function.

When the directory server starts up and processes all of the schema in its repository, each attribute that is marked with one of our real-time or "dynamic" OID is treated differently internally than the other, static attributes. Each attribute that is dynamic is known by the directory server to be unmodifiable via the usual LDAP protocol, instead it is only available for search or read requests (e.g. it is read-only from the LDAP interface).

When a client application searches the directory for an entry that has a dynamic attribute type according to its OID, the directory server invokes a function to resolve that attribute's current, real-time value. According to our preferred embodiment, this function may be a portion of electronic logic, a software module, class, method, or other entity, preferably external to the directory server such that it may be supplied by the vendor of the directory server, or by the owner/operator of the directory server (e.g. customer-supplied). By avoiding updating the value of the attribute when no client is requesting its value, our invention avoids unnecessary use of processor and communications bandwidth. By updating the value of the attribute "on demand" in response to a request for the value, our invention provides real-time data rather than old or stale data.

In our prototype, we facilitated user development of such library functions in two ways. First, the server first looks for a function implemented as a shared library with the same name as the attribute name. In our example, we implemented a UNIX library function "currentTemp.so" with predefined methods that the server can call to retrieve the needed dynamic information, using an appropriate Software Development Kit ("SDK"). Second, if no shared library is found by the directory server, the server looks for a .class file, such as a Java implementation of the dynamic attribute value resolving function, with the same name as the attribute (e.g. currentTemp.class). Again, using a predefined SDK, the server is enabled to call a specific method to retrieve the dynamic data.

It should be noted here that user-written dynamic attribute programs are not restricted to text-only output, but binary data may also be handled. This allows an LDAP server to generate, for example, the latest stock chart, a recent weather photo, or an audio clip from an executive speech.

During directory server processing for a search request, any requested entry that includes dynamic data is iterated over, and the data collected for each dynamic attribute through resolving the values with the related external functions. Following the "currentTemp" example above, a client would receive a reply such as:

City=Austin, state=Texas,c=US
Objectclass:city
CurrentTemp:82F
Population:602000

In this example, the values "Austin", "Texas", "US", and "602000 of the attributes city name, state, country, and population are stored and retrieved from the LDAP directory, as these items are relatively static in value. However, the value "82 F" of the real-time attribute CurrentTemp is not stored in the LDAP, and is resolved in real-time by a function such as currentTemp.so. The function currentTemp.so in our prototype actually accesses real-time data from the online resource "weather.com", parses the data, and returns the value "82 F" to the LDAP directory server, which then combines that information with the other static information from the LDAP directory, and passes it back to the requesting client.

It is important to note that the value "82 F" was never actually stored in or retrieved from the LDAP directory. In this manner, the handling of dynamic data is transparent to any requesting client, thereby providing a powerful extension to the directory server protocol to allow reading of dynamic data without changing or extending the protocol itself (e.g. client applications are backwards compatible to our improved directory server).

System Realization of the Invention

In one embodiment, our invention is realized in part or entirely in custom circuitry such as an Application Specific Integrated Circuit ("ASIC"), for use as an LDAP Server Real-time Attribute Co-processor, for example.

Figure 7:
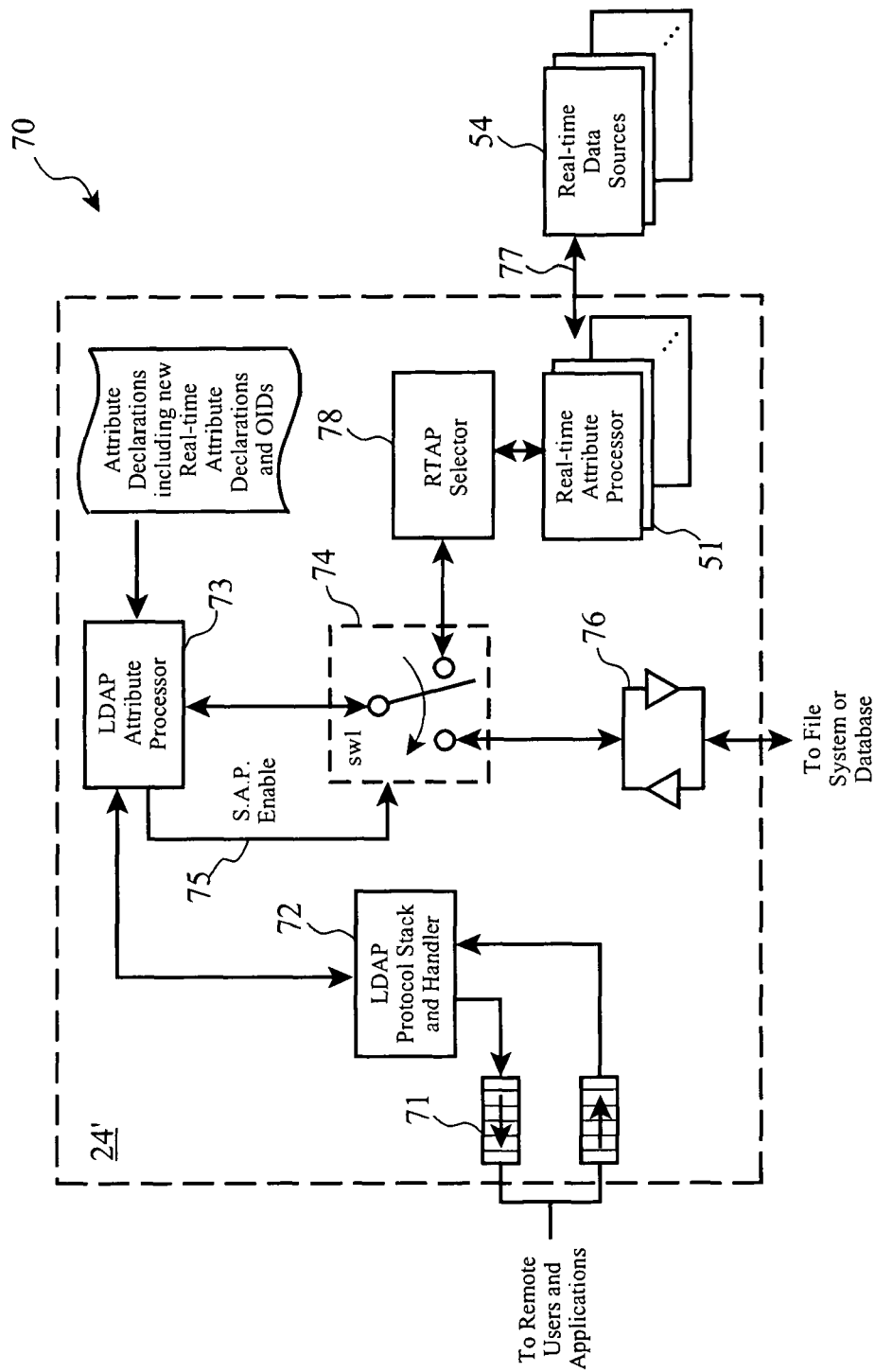
FIG. 7 illustrates the logic of the present invention suitable for implementation in part or whole using electronic circuitry, such as in an Application Specific Integrated Circuit, programmable logic, or other suitable circuitry.

Turning to FIG. 7, a logic diagram for our enhanced LDAP Server (24') is shown. Two queues (71) are provided to receive requests and respond to requests, respectively, for remote users and client applications via a communications network. An LDAP protocol stack and request handler (72) interfaces to the queues (71), and to an LDAP attribute processor. The LDAP attribute processor (73) examines the requests and the declarations for the attributes requested, and for the requested attributes which are normal, static LDAP attributes, retrieves or modifies the attribute(s) in the LDAP directory via a bi-directional file system interface (76).

However, a new signal, Real-time Attribute Processor ("RTAP") enable (75), is controlled by the LDAP attribute processor (73) to allow for selective retrieval of values of attributes which are defined by our new real-time data schema, as previously discussed. When the LDAP attribute processor (73) receives a request for such a dynamic attribute, the RTAP enable (75) signal is controlled such that Switch 1 (74) redirects the data flow from the file system interface (76) to an RTAP Module Selector (78), which then determines which RTAP module (51) to invoke. According to the previous discussion, the RTAP module naming convention, or addressing in this implementation, is preferably a variation of the attribute name itself, in order to facilitate the selection mechanism. For example, a logical operation may be performed on the attribute name to produce an address value, which is then used to select a portion of logic, an addressable buffer, or selectable interface, from which the dynamic value is to be received.

The selected RTAP module (51) is then invoked or addressed, which accesses one or more real-time data sources (54) such as web sites, data interfaces, etc., performs the necessary data manipulations (e.g. calculations, image processing, etc.), and returns the resulting data for the real-time value(s) of the attributes to the LDAP attribute process (73) via Switch 1 (74).

In this way, each request is handled by parsing the actions into actions for static attributes, which are handled in the normal LDAP manner, and actions for dynamic attributes, which are resolved by RTAP modules selected from a group of RTAP modules accordingly. Dynamic data values, however, are not stored in the LDAP directory or file system, thereby minimizing the overhead impact of adding dynamic data to a directory which is optimized for static data storage.

Invention Realization as a Software Product

Our Real-time Attribute Processor ("RTAP"), provides an exclusive method to handle dynamic data for directory services which can alternatively be realized in software implementations, either in part or entirely. Our RTAP cooperates with an LDAP server product such as the IBM Directory Server to process application requests dynamic data in this embodiment.

Figure 8:
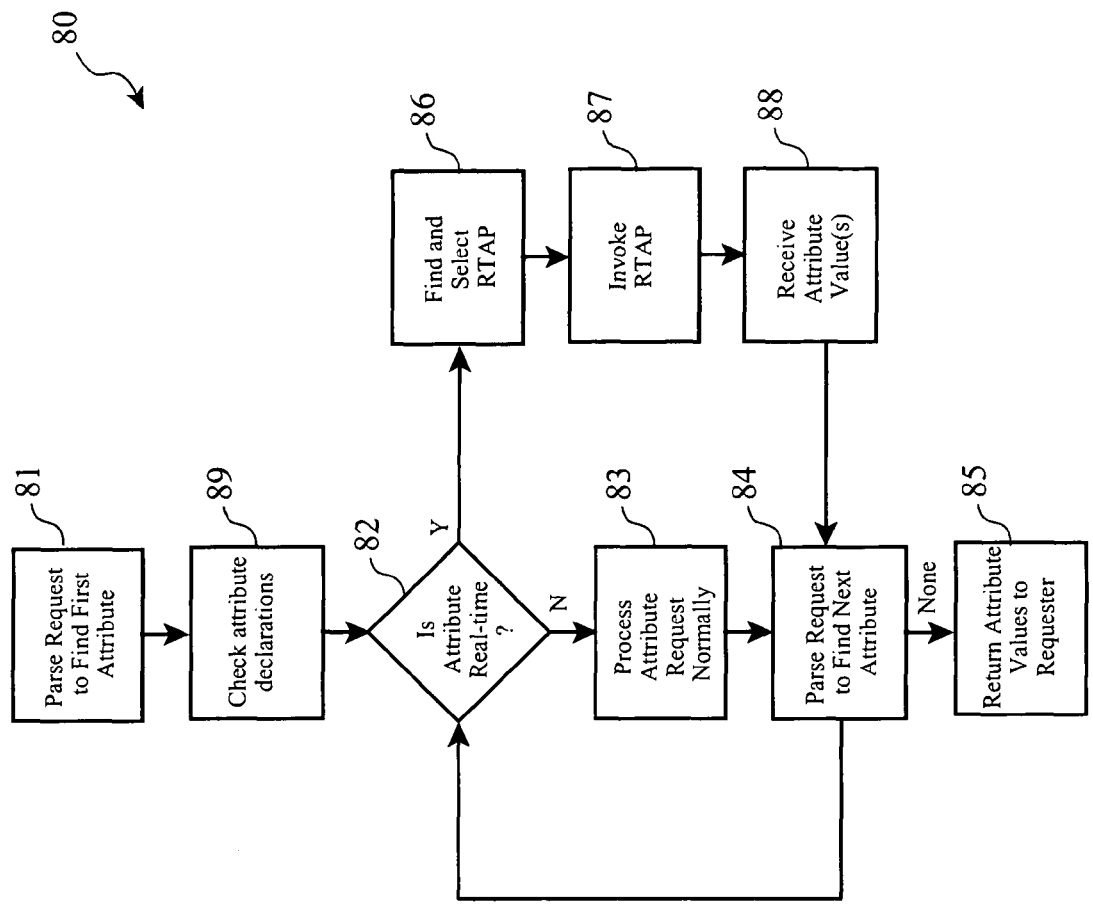
FIG. 8 illustrates the logic of the present invention suitable for implementation in part or whole using software-based methods.

As previously described, the RTAP software implementation defines special OIDs to distinguish dynamic, real-time attributes from traditional, static attributes. This allows the special OIDs to be handled differently within the LDAP directory server during the processing of the LDAP requests, whether they be requests to write, read-modify, or read the data. As shown in FIG. 8, the previously described processes (80) of:
  (a) parsing (81) LDAP requests according to attribute OID and checking (89) attribute declarations to determine if an attribute is real-time or static;
  (b) selecting (86) an appropriate RTAP module to resolve the real-time value of attributes declared as real-time attributes according to our special schema;
  (c) invoking (87) the selected RTAP module;
  (d) receiving (88) a resolved value for the real-time attribute; and
  (e) returning (85) the resolved value to the requesting client while suppressing or avoiding the storing of the actual value in the LDAP directory;

is realizable in software such as in a UNIX library function or a Java class, the naming convention of which may be based upon variations of the attribute name to facility ease of function selection. In our example regarding currentTemp attribute value reads, the function "currentTemp.class" or "currentTemp.so" may be found and invoked.

As previously described, however, our preferred embodiment handles static attribute requests normally (82, 83, 84), and in conjunction or combination with our new real-time attribute handling.

This embodiment of the present invention may be run or executed by any suitable computing platform, and especially on an IBM enterprise-class server such as the IBM eServer product line including the IBM Directory Server product. However, as a wide variety of computing platforms may be utilized in realization of the invention in this embodiment, we now present some general information regarding suitable platforms.

These common computing platforms can alternatively include personal computers as well as portable computing platforms, such as personal digital assistants ("PDA"), web-enabled wireless telephones, and other types of personal information management ("PIM") devices, having suitable computational bandwidth, memory, and communications capabilities.

Figure 9:
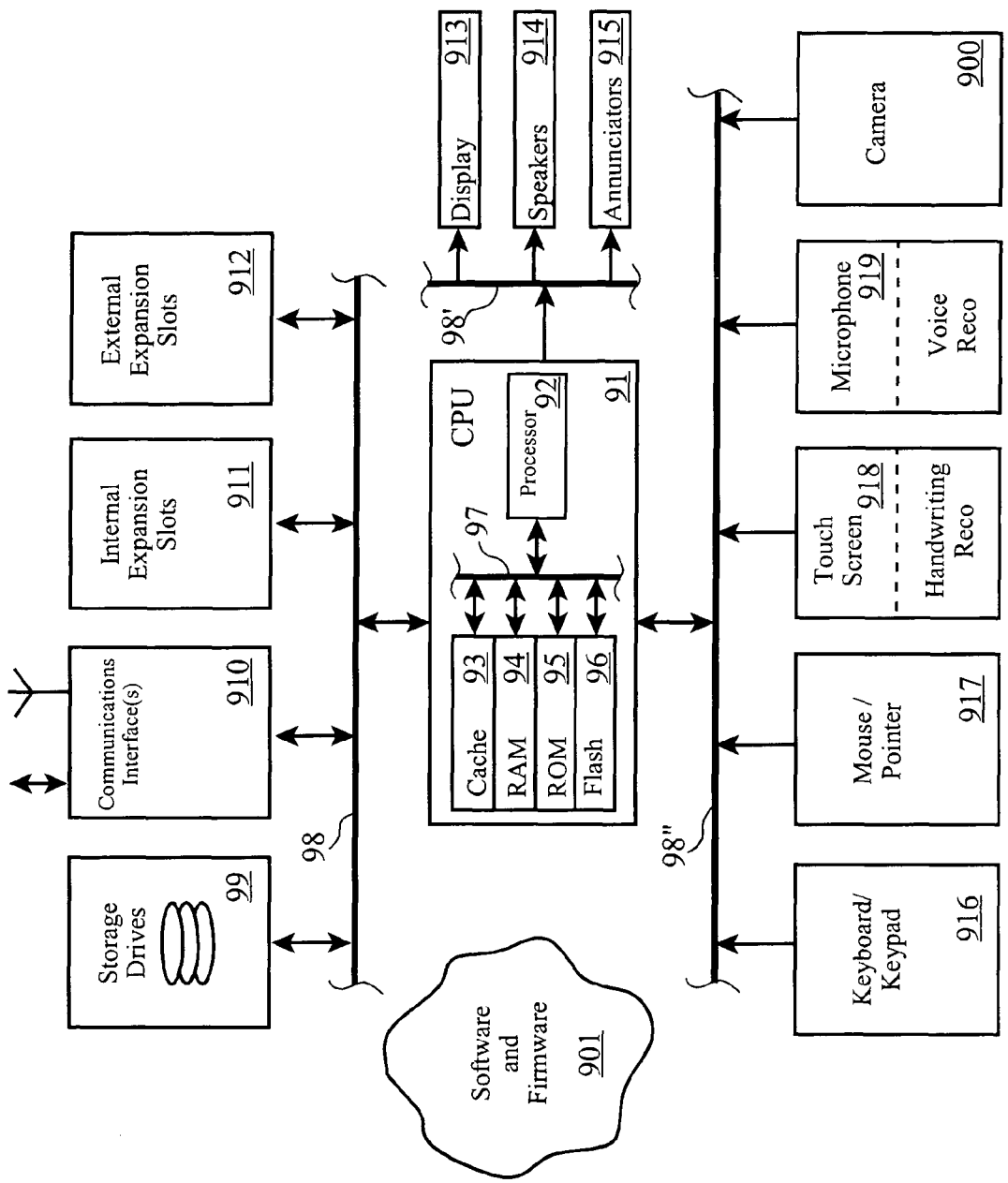
FIG. 9 depicts a generalized computing platform architecture, such as an enterprise server, a personal computer, a personal digital assistant, web-enabled wireless telephone, or other processor-based device.

Turning to FIG. 9, a generalized architecture is presented including a central processing unit (91) ("CPU"), which is typically comprised of a microprocessor (92) associated with random access memory ("RAM") (94) and read-only memory ("ROM") (95). Often, the CPU (91) is also provided with cache memory (93) and programmable FlashROM (96). The interface (97) between the microprocessor (92) and the various types of CPU memory is often referred to as a "local bus", but also may be a more generic or industry standard bus.

Many computing platforms are also provided with one or more storage drives (99), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (910), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infra-red data arrangement (IrDA) interface, too.

Computing platforms are often equipped with one or more internal expansion slots (911), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (912) allowing the user the ability to easily install and remove hardware expansion devices, such as PCMCIA cards. SmartMedia cards, and various proprietary modules such as removable hard drives, CD drives, and floppy drives.

Often, the storage drives (99), communication interfaces (10), internal expansion slots (911) and external expansion slots (912) are interconnected with the CPU (91) via a standard or industry open bus architecture (98), such as ISA, EISA, or PCI. In many cases, the bus (8) may be of a proprietary design.

A computing platform is usually provided with one or more user input devices, such as a keyboard or a keypad (916), and mouse or pointer device (917), and/or a touch-screen display (918). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (918) is usually provided, often with handwriting recognition capabilities.

Additionally, a microphone (919), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (913), are also provided with most computing platforms. The display (913) may take many forms, including a Cathode Ray Tube ("CRT"), a Thin Flat Transistor ("TFT") array, or a simple set of light emitting diodes ("LED") or liquid crystal display ("LCD") indicators.

One or more speakers (914) and/or annunciators (915) are often associated with computing platforms, too. The speakers (914) may be used to reproduce audio and music, such as the speaker of a wireless telephone or the speakers of a personal computer. Annunciators (915) may take the form of simple beep emitters or buzzers, commonly found on certain devices such as PDAs and PIMs.

These user input and output devices may be directly interconnected (98', 98") to the CPU (91) via a proprietary bus structure and/or interfaces, or they may be interconnected through one or more industry open buses such as ISA, EISA, PCI, etc. The computing platform is also provided with one or more software and firmware (901) programs to implement the desired functionality of the computing platforms.

Figure 10:
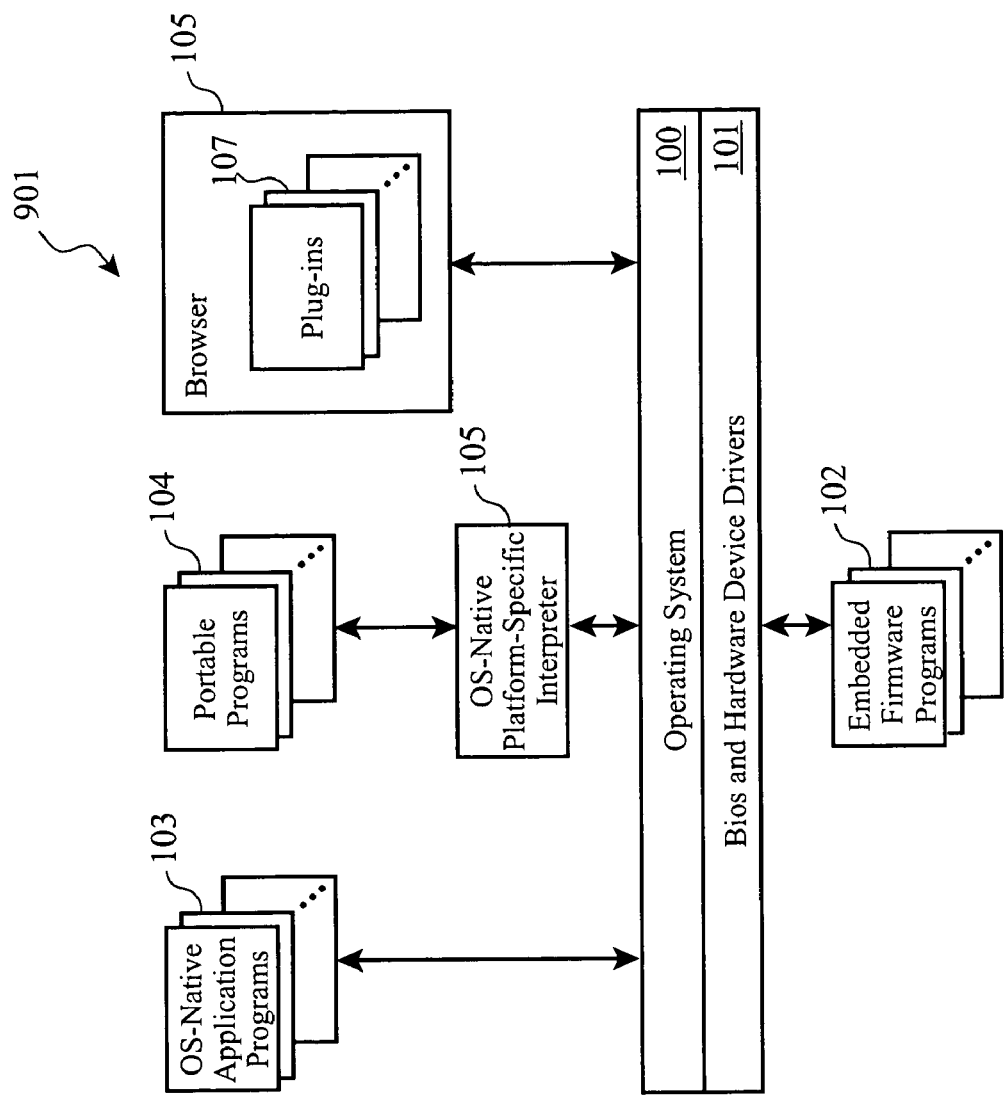
FIG. 10 shows a generalized organization of software and firmware associated with the generalized architecture of FIG. 9.

Turning now to FIG. 10, more detail is given of a generalized organization of software and firmware (901) on this range of computing platforms. One or more operating system ("OS") native application programs (103) may be provided on the computing platform, such as word processors, spreadsheets, contact management utilities, address book, calendar, email client, presentation, financial and bookkeeping programs.

Additionally, one or more "portable" or device-independent programs (104) may be provided, which must be interpreted by an OS-native platform-specific interpreter (105), such as Java™ scripts and programs.

Often, computing platforms are also provided with a form of web browser or micro-browser (106), which may also include one or more extensions to the browser such as browser plug-ins (107).

The computing device is often provided with an operating system (100), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (101) are often provided to allow the operating system (100) and programs to interface to and control the specific hardware functions provided with the computing platform.

Additionally, one or more embedded firmware programs (102) are commonly provided with many computing platforms, which are executed by onboard or "embedded" microprocessors as part of the peripheral device, such as a micro controller or a hard drive, a communication processor, network interface card, or sound or graphics card.

As such, FIGS. 9 and 10 describe in a general sense the various hardware components, software and firmware programs of a wide variety of computing platforms, including but not limited to personal computers, PDAs, PIMs, web-enabled telephones, and other appliances such as WebTV™ units, suitable for realization of the present invention;

Improved Directory Services Using RTAP

Figure 5:
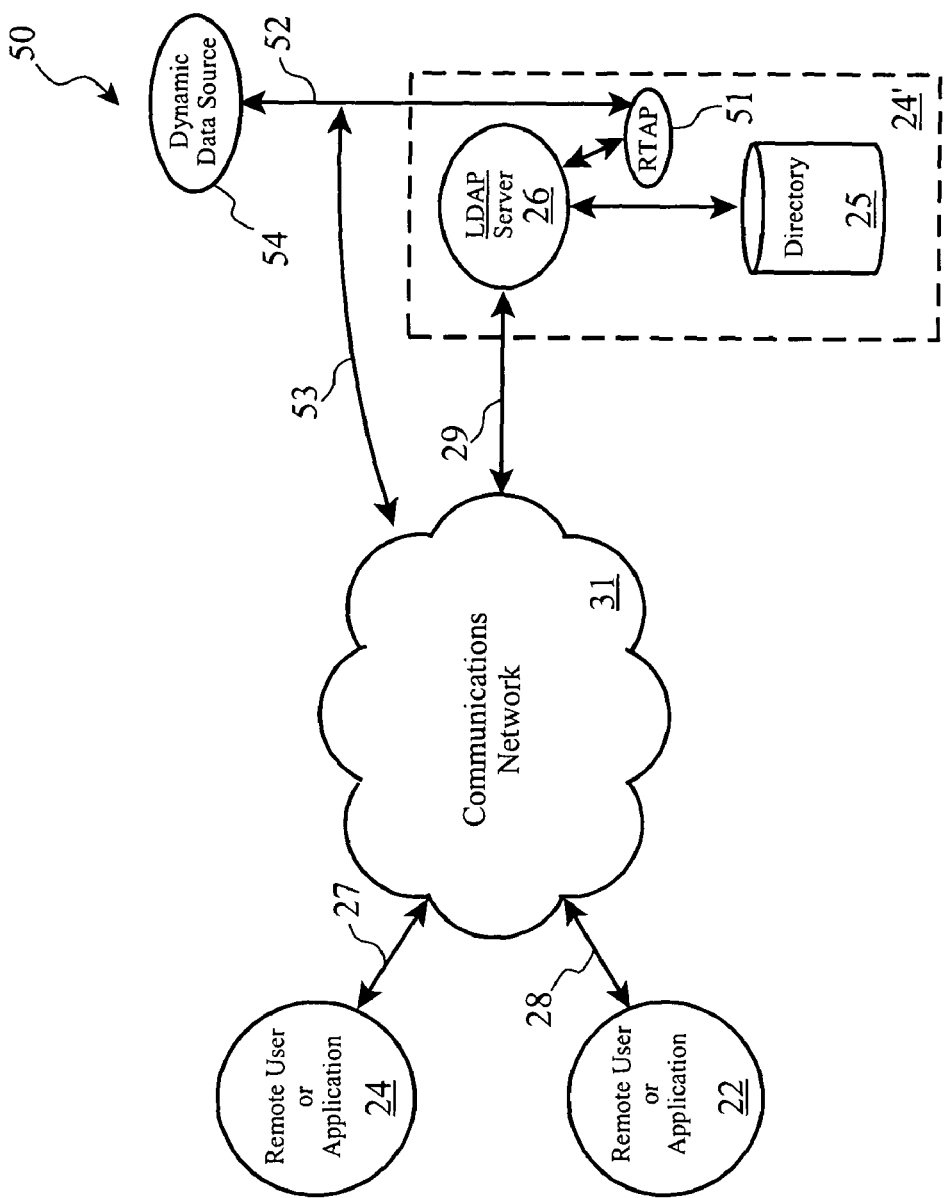
FIG. 5 depicts LDAP communications processes using our new Real-time Attribute Processor.

Turning now to FIG. 5, an illustration of the improved directory services interactions (50) of the invention is shown. Remote users or application programs (22, 23) request an element of information from a directory server (24') which represents a value that is relatively dynamic in nature, such as a current stock price during the hours of a trading session.

The requests are transmitted from the clients (23, 22) to the directory server (24') as previously described, such as by using TCP/IP and LDAP protocols. This allows the clients to request dynamic or real-time data in exactly the same manner as they currently request static data, without change to the protocol, such that existing applications can remain unchanged when utilizing the invention.

When parsing the request, the directory server (26) detects one of our special OIDs for the requested attributes which signals the directory server that these are attributes for which values are to be resolved by an RTAP module. As a result, the directory server calls or invokes the appropriate user program(s) (e.g. our RTAPs) (51), to resolve the value(s) of the requested dynamic attributes, such as by contacting a stock ticker source.

The RTAP (51) then returns the real-time value(s), such as stock prices, to the directory server (26), which then combines the dynamic values with any other static attributes to complete the request, and returns the entire data set to the requesting client (22, 23). The requesting client receives the return attribute values as if they were all static values, and as if they were all actually stored in the directory (25), even though the real-time values were never actually stored in the directory (25).

Figure 6:
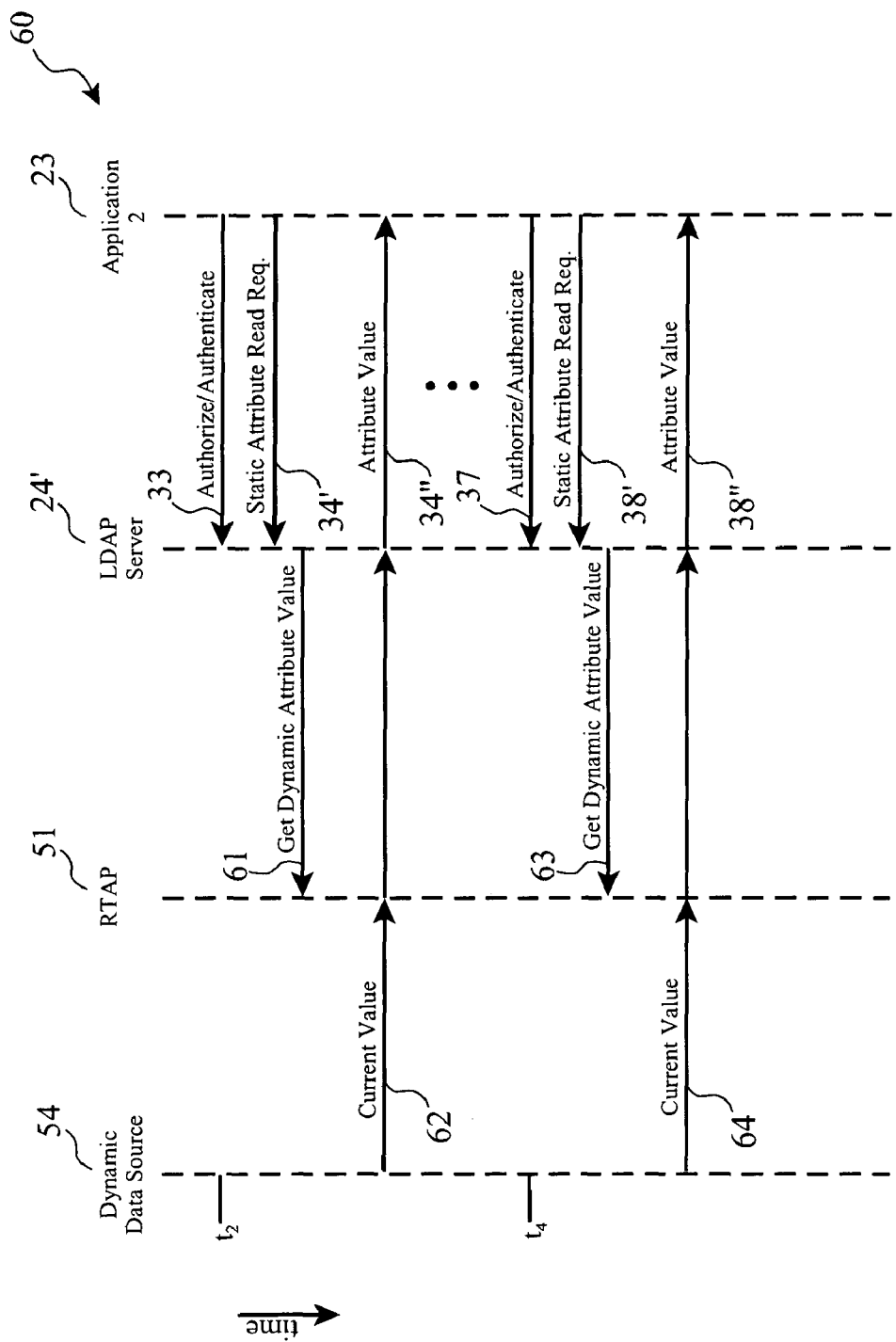
FIG. 6 provides an example of two applications accessing attribute values in an LDAP directory with further illustration of handling dynamic data with our new Real-time Attribute Processor.

FIG. 6 provides more details (60) of how a request is processed according to the invention. When a client application (23) at a time $t_2$ performs an authentication and authorization (33) process followed by a search or read request (34') for an LDAP static attribute value which is actually a dynamic information element, the enhanced LDAP server (24') invokes (61) the appropriate RTAP (51) process or method, which in turn retrieves or otherwise determines (62) current real-time value of the attribute(s) based upon a dynamic data source (54). These real-time values then are returned (34") to the LDAP server and the requesting client (23) as if it were a normal result from a static attribute return.

Figure 3:
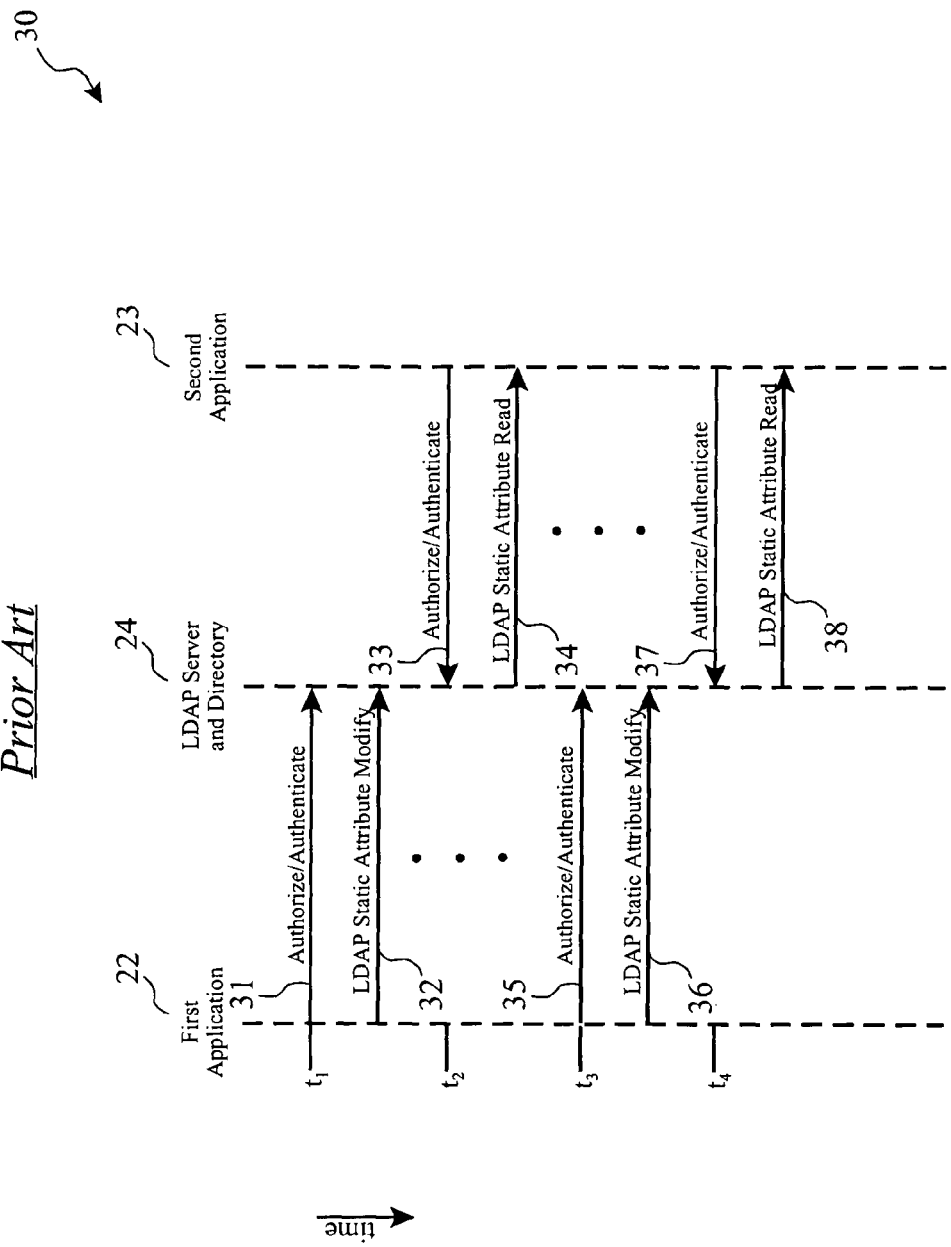
FIG. 3 provides an example of two applications accessing an attribute in an LDAP directory.
Figure 4:
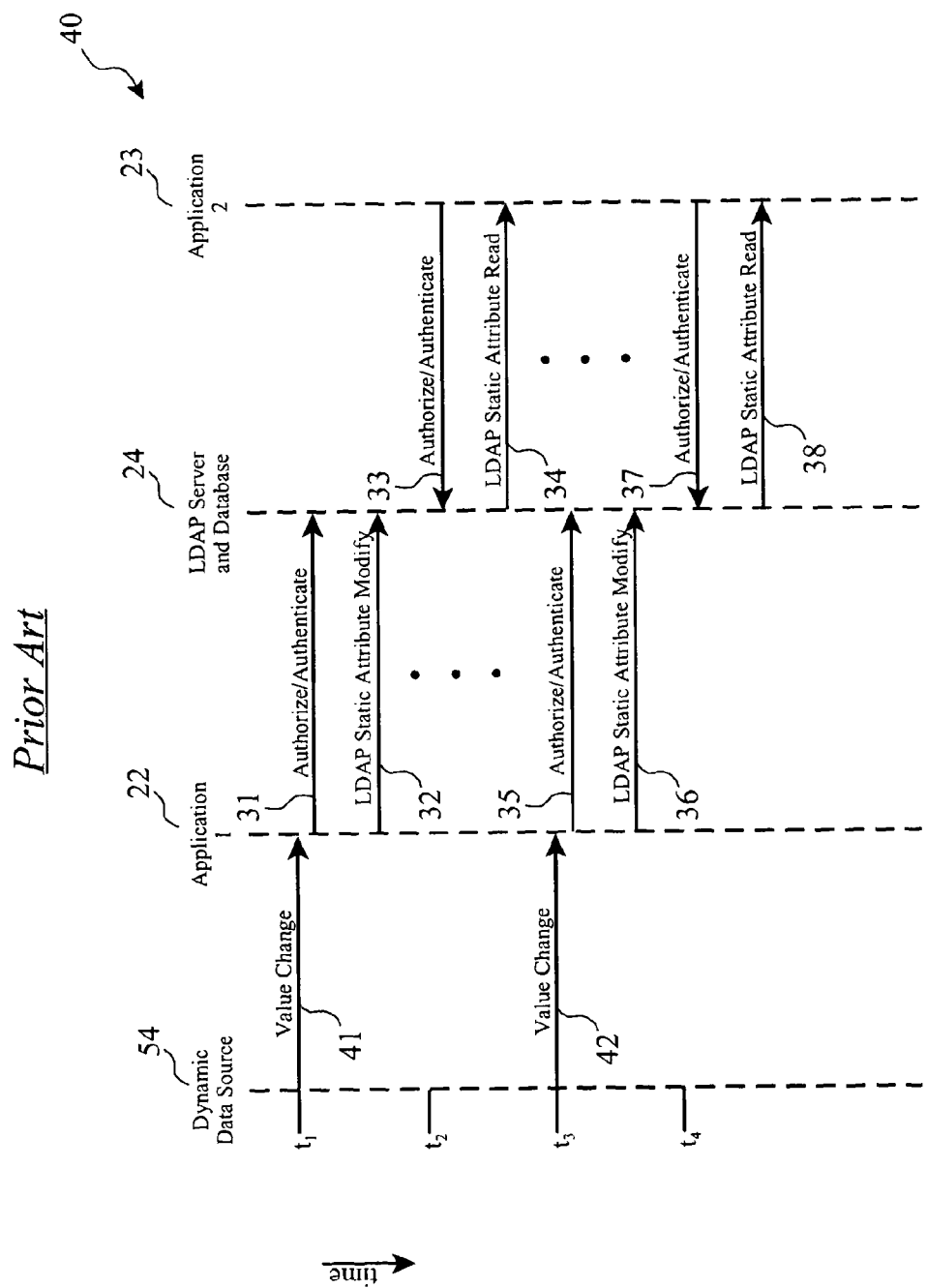
FIG. 4 provides an example of two applications accessing values of attributes in an LDAP directory with further illustration of converting dynamic data for storage as static data in the LDAP directory.

At a later time $t_4$, when an application (23) requests (37, 38') the values for the same attributes, a current value is determined (63, 64) and returned (38") similarly. It is important to note in comparison to FIGS. 3 and 4 that there are several advantages evident in FIG. 6 using the present invention:

(a) the application which was required to poll and update the dynamic values of the attributes in the directory is eliminated;

(b) the burdensome LDAP commands by the polling application are eliminated, thereby improving the performance of the LDAP server;

(c) real-time values of specially designated attributes are determined on-demand at the time of the request from a client, which allows the value to be more current;

(d) stale, "snapshots" of dynamic data are never stored in the directory itself but instead are determined or retrieved on demand;

(e) the interface between the requesting application client and the directory server is unchanged, allowing backwards compatibility with legacy applications and protocol stacks; and (f) the improved directory server is scalable and configurable for a wide variety of customer and enterprise requirements through the open architecture of the RTAP modules; and

CONCLUSION

The assumption that data stored in a directory is primarily static in nature is a largely inhibiting factor for directory servers, such as LDAP servers, when some data stored in the directory is dynamic and is updated intensively. Using the present invention, repetitive updates to the directory server are no longer necessary, nor are "midway" clients. The notion that these attributes are externally viewed no differently than any other LDAP attributes gives us a powerful extension to the protocol, as well as a significant jump on our competitor's implementation.

It will be recognized by those skilled in the art that the foregoing examples and details of alternate embodiments are provided for illustration of the invention, and that certain variations and modifications may be made without departing from the spirit and scope of the present invention. Therefore, the scope of the present invention should be determined by the following claims.

What is claimed is:

1. A computer-implemented method comprising:
providing by a computer at least one declaration for an attribute to be handled as a real-time attribute associated with but external to a directory structure;
receiving by a computer a directory access protocol request for access to one or more attribute values from the associated directory structure;
detecting by a computer in the received request a request to access an attribute declared as a real-time external attribute;
responsive to the detecting of a request for a real-time attribute, resolving by a computer a real-time value by obtaining an attribute value from a real-time source external to the directory structure;
responsive to the resolving, converting by a computer the obtained attribute value from a real-time attribute to a static attribute, wherein the real-time attribute is incompatible with the directory access protocol, and wherein the static attribute is compatible with the directory access protocol; and
returning by a computer to a requester the converted real-time attribute directly in the directory access protocol, wherein storing and updating of the converted real-time attribute value in the directory structure is eliminated or avoided.

2. The method as set forth in claim 1 wherein the detecting comprises parsing by a computer a Lightweight Directory Access Protocol requests for attribute values.

3. The method as set forth in claim 1 wherein the returning comprises returning by a computer the value according to a Lightweight Directory Access Protocol.

4. The method of claim 1 wherein the resolving a real-time value by obtaining an attribute value from a real-time source external to the directory structure further comprises selecting according to a predetermined selection schema a real-time attribute processor from a plurality of available real-time attribute processors, invoking the selected real-time attribute processor, and wherein the resolving is performed by the invoked real-time attribute processor.

5. The method of claim 4 wherein the predetermined selection schema comprises a schema employing a variation of a name of the requested directory attribute to identify a real-time attribute processor for selection.

6. A computer readable storage memory comprising:
a computer readable storage memory suitable for encoding program instructions; and
first program instructions to provide at least one declaration for an attribute to be handled as a real-time attribute associated with but external to a directory structure;
second program instructions to receive a directory access protocol request for access to one or more attribute values from the associated directory structure;
third program instructions to detect in the received request a request to access an attribute declared as a real-time external attribute;
fourth program instructions to, responsive to the detecting of a request for a real-time attribute, resolve a real-time value by obtaining an attribute value from a real-time source external to the directory structure;
fifth program instructions to, responsive to the resolving, converting the obtained attribute value from a real-time attribute to a static attribute, wherein the real-time attribute is incompatible with the directory access protocol, and wherein the static attribute is compatible with the directory access protocol; and
sixth program instructions to return to a requester the converted real-time attribute directly in the directory access protocol, wherein storing and updating of the converted real-time attribute value in the directory structure is eliminated or avoided;
wherein the first, second, third, fourth, fifth and sixth program instructions are stored by the computer readable storage memory.

7. The computer readable storage memory as set forth in claim 6 wherein the program instructions to detect comprises program instructions to parse a Lightweight Directory Access Protocol requests for attribute values.

8. The computer readable storage memory as set forth in claim 6 wherein the returning comprises returning the value according to a Lightweight Directory Access Protocol.

9. The computer readable memory of claim 6 wherein the resolving a real-time value by obtaining an attribute value from a real-time source external to the directory structure further comprises selecting according to a predetermined selection schema a real-time attribute processor from a plurality of available real-time attribute processors, invoking the selected real-time attribute processor, and wherein the resolving is performed by the invoked real-time attribute processor.

10. The computer readable memory of claim 9 wherein the predetermined selection schema comprises a schema employing a variation of a name of the requested directory attribute to identify a real-time attribute processor for selection.

11. A system comprising a hardware means for performing a logical process, wherein the logical process comprises:
providing at least one declaration for an attribute to be handled as a real-time attribute associated with but external to a directory structure;
receiving a directory access protocol request for access to one or more attribute values from the associated directory structure;
detecting in the received request a request to access an attribute declared as a real-time external attribute;
responsive to the detecting of a request for a real-time attribute, resolving a real-time value by obtaining an attribute value from a real-time source external to the directory structure;
responsive to the resolving, converting the obtained attribute value from a real-time attribute to a static attribute, wherein the real-time attribute is incompatible with the directory access protocol, and wherein the static attribute is compatible with the directory access protocol; and
returning to a requester the converted real-time attribute directly in the directory access protocol, wherein storing and updating of the converted real-time attribute value in the directory structure is eliminated or avoided.

12. The system as set forth in claim 11 wherein the hardware means comprises at least in part a microprocessor.

13. The system as set forth in claim 11 wherein the hardware means comprises at least in part an electronic circuit.

14. The system as set forth in claim 13 wherein the electronic circuit is selected from a group consisting of an application specific integrated circuit, and a programmable logic circuit.

15. The system as set forth in claim 11 wherein the detecting comprises parsing a Lightweight Directory Access Protocol requests for attribute values.

16. The system as set forth in claim 11 wherein the returning comprises returning the value according to a Lightweight Directory Access Protocol.

17. The system of claim 11 wherein the logical process resolving a real-time value by obtaining an attribute value from a real-time source external to the directory structure further comprises a logical process selecting according to a predetermined selection schema a real-time attribute processor from a plurality of available real-time attribute processors, invoking the selected real-time attribute processor, and wherein the resolving is performed by the invoked real-time attribute processor.

18. The system of claim 17 wherein the predetermined selection schema comprises a schema employing a variation of a name of the requested directory attribute to identify a real-time attribute processor for selection.

* * * * *